United States Patent
Cho et al.

(10) Patent No.: US 10,618,413 B2
(45) Date of Patent: Apr. 14, 2020

(54) SYSTEM AND METHOD FOR APPLYING COAST REGENERATION TORQUE OF VEHICLE

(71) Applicants: Hyundai Motor Company, Seoul (KR); Kia Motors Corporation, Seoul (KR)

(72) Inventors: Woo cheol Cho, Daejeon (KR); Soo Lim Han, Gyeonggi-Do (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 0 days.

(21) Appl. No.: 16/131,707

(22) Filed: Sep. 14, 2018

(65) Prior Publication Data

US 2019/0193568 A1 Jun. 27, 2019

(30) Foreign Application Priority Data

Dec. 22, 2017 (KR) ........................ 10-2017-0178091

(51) Int. Cl.
| | | |
|---|---|---|
| *B60L 7/18* | (2006.01) | |
| *B60L 3/10* | (2006.01) | |
| *B60L 15/20* | (2006.01) | |
| *B60T 8/1763* | (2006.01) | |
| *B60T 8/1761* | (2006.01) | |

(52) U.S. Cl.
CPC .............. *B60L 7/18* (2013.01); *B60L 3/102* (2013.01); *B60L 3/108* (2013.01); *B60L 15/2009* (2013.01); *B60T 8/1761* (2013.01); *B60T 8/1763* (2013.01); *B60T 8/17616* (2013.01); *B60L 2240/423* (2013.01); *B60L 2240/461* (2013.01); *B60L 2240/465* (2013.01); *B60L 2260/24* (2013.01); *B60T 2270/602* (2013.01); *B60T 2270/611* (2013.01)

(58) Field of Classification Search
CPC ....................................................... B60L 7/18
USPC ........................................ 318/376, 375, 362
See application file for complete search history.

(56) References Cited

U.S. PATENT DOCUMENTS

| | | | | |
|---|---|---|---|---|
| 6,691,013 B1 * | 2/2004 | Brown | ..................... | B60K 6/44 |
| | | | | 701/70 |
| 9,463,782 B2 * | 10/2016 | Kikawa | ..................... | B60L 7/18 |
| 9,637,004 B2 * | 5/2017 | Johansson | ............... | B60L 3/102 |
| 2016/0368384 A1 | 12/2016 | Johansson et al. | | |

FOREIGN PATENT DOCUMENTS

| | | |
|---|---|---|
| JP | 5985724 B2 | 9/2016 |
| KR | 10-2012-0118106 | 10/2012 |
| KR | 10-2017-0024856 | 3/2017 |

\* cited by examiner

*Primary Examiner* — David Luo
(74) *Attorney, Agent, or Firm* — Mintz Levin Cohn Ferris Glovsky and Popeo, P.C.; Peter F. Corless

(57) ABSTRACT

A system and method of applying a coast regeneration torque of a vehicle are provided. The method corrects a magnitude of slip (or a slip ratio) which is considered when a coast regeneration torque is to be variably controlled while the vehicle is coasting.

12 Claims, 3 Drawing Sheets

SYSTEM AND METHOD FOR APPLYING COAST REGENERATION TORQUE OF VEHICLE

CROSS REFERENCE TO RELATED APPLICATION

The present application claims priority of Korean Patent Application No. 10-2017-0178091 filed on Dec. 22, 2017, the entire contents of which is incorporated herein for all purposes by this reference.

BACKGROUND

Field of the Invention

The present invention relates to a system and method of applying a coast regeneration torque of a vehicle, and more particularly, to a system and method of applying a coast regeneration torque of a vehicle to appropriately correct a magnitude of slip (or a slip ratio) which is considered when a coast regeneration torque is to be variably controlled while a vehicle is coasting.

Description of the Related Art

Recently, as environmental concerns have increased, research and development, and commercialization are actively ongoing regarding eco-friendly vehicles, such as electric vehicles, hybrid vehicles, plug-in hybrid vehicles, fuel cell vehicles, and the like, which drive motors using electric energy. In particular, during coasting in which an eco-friendly vehicle is traveling by inertia, the eco-friendly vehicle operates a motor and/or a starter generator as a generator to recover inertial energy, and accordingly, the operation of the motor and/or the starter generator is followed by braking of the eco-friendly vehicle. In other words, during coasting, the eco-friendly vehicle may recover the inertial energy as power by setting a coasting torque (e.g., a torque opposite a driving direction, or a coast regeneration torque) based on a vehicle speed to the motor and, at this point, braking is performed.

Generally, while a vehicle is coasting, it is advantageous that a coast regeneration torque is set to be large to increase an energy recovery factor however, when a friction coefficient of a road, such as a snowy road, an icy road, and a rainy road, is small, slip may occur due to a coast regeneration torque. Particularly, when slip occurs due to a coast regeneration torque, stability of a vehicle is deteriorated.

Accordingly, the applicant of the present invention has filed, the invention related to an apparatus and a method for controlling a vehicle having a motor capable of preventing a jolting of the vehicle according to whether a coast regeneration torque is applied when the vehicle is traveling on a road with a low friction coefficient. According to the above-described invention, a coasting regeneration torque which is regeneratively braked is varied through a driving motor while the vehicle is coasting based on a difference in speed between a driving wheel and a non-driving wheel of the vehicle while the vehicle is being driven, a correction temperature determined based on an external temperature and a battery temperature, a friction coefficient of a road, and an operating state of an anti-lock brake system (ABS).

However, the control method implemented through the above-described invention requires accurate calculation a slip ratio of a wheel, that is, the difference in speed between the driving wheel and the non-driving wheel. However, owing to a hardware cause of a vehicle in which a load of the vehicle is excessively applied to a front wheel such that a speed of the front wheel becomes slower than a speed of a rear wheel when tires having different sizes are respectively installed at a driving wheel and a non-driving wheel, or when regenerative braking is performed according to a characteristic of a vehicle suspension, a slip ratio of wheels, that is, a difference in speed between the driving wheel and the non-driving wheel may be unable to be calculated accurately.

For example, when a difference in speed between a driving wheel and a non-driving wheel occurs due to a hardware condition of a vehicle rather than a surface condition of a road, and the control method according to the above-described invention is applied even though the vehicle is maintained in a stable state, control of reducing a coast regeneration torque is performed to prevent occurrence of slip resulting from the difference in speed between the driving wheel and the non-driving wheel. Since the difference in speed between the driving wheel and the non-driving wheel is continuously maintained by the hardware condition of the vehicle, the control method according to the above-described invention continuously reduces the coast regeneration torque, and accordingly, an energy recovery factor is decreased to deteriorate fuel efficiency and regenerative braking is reduced due to the reduced coast regeneration torque to cause vehicle slip, causing driving ability to be deteriorated.

SUMMARY

Accordingly, the present invention provides a system and method of applying a coast regeneration torque of a vehicle, which is capable of improving an energy recovery factor due to regenerative braking and improving a traveling sensation by appropriately correcting a magnitude of vehicle slip (e.g., or a slip ratio, or a difference in speed between a driving wheel and a non-driving wheel) which is considered when a coast regeneration torque is to be variably controlled while the vehicle is coasting.

According to one aspect, a method for applying a coast regeneration torque, may include applying a coast regeneration torque to a drive motor configured to provide power to a driving wheel of a vehicle while the vehicle is coasting; detecting occurrence of wheel slip of the vehicle while the coast regeneration torque is applied to the drive motor; deriving, when the wheel slip occurs, a wheel speed difference or a wheel slip ratio based on a speed of the vehicle and a wheel speed of the driving wheel; determining whether to correct the derived wheel speed difference or the derived wheel slip ratio based on a magnitude of the coast regeneration torque, and a magnitude and a variation of the derived wheel speed difference or the derived wheel slip ratio; and applying, when the derived wheel speed difference or the derived wheel slip ratio is determined to be corrected as the determination result, a correction value determined based on the variation of the coast regeneration torque to the derived wheel speed difference or the derived wheel slip ratio, and resetting the coast regeneration torque based on the wheel speed difference or the wheel slip ratio to which the correction value is applied.

In particular, the wheel speed difference may be determined by a difference between the speed of the vehicle and the wheel speed of the driving wheel or a difference between a wheel speed of the non-driving wheel of the vehicle and the wheel speed of the driving wheel thereof. The wheel slip ratio may be determined by dividing the difference between the speed of the vehicle and the wheel speed of the driving wheel by the speed of the vehicle, or by dividing the difference between the wheel speed of the non-driving wheel of the vehicle and the wheel speed of the driving wheel thereof by the wheel speed of the non-driving wheel.

The determination of whether the derived wheel speed difference is to be corrected may include determining that the derived wheel speed difference or the derived wheel slip ratio is required to be corrected when the magnitude of the coast regeneration torque is less than a first predetermined reference value, and the wheel speed difference or the wheel slip ratio, which is derived based on the speed of the vehicle and the wheel speed of the driving wheel, is in a range of greater than a second predetermined reference value to less than a third predetermined reference value. The first predetermined reference value may be set as a predicted magnitude of the coast regeneration torque that wheel slip does not occur, and the second and third predetermined reference values may be set as upper and lower limit values of a range in which slip does not occur at a wheel of the vehicle and a specific value for the wheel speed difference or the wheel slip ratio is expected to be derived through a calculation for deriving the wheel speed difference or the wheel slip ratio.

Additionally, the method may include determining that the derived wheel speed difference or the derived wheel slip ratio is required to be corrected when the variation of the coast regeneration torque is less than a first predetermined reference value, and the wheel speed difference or the wheel slip ratio, which is derived based on the speed of the vehicle and the wheel speed of the driving wheel, is less than a second predetermined reference value. Each of the first and second predetermined reference values may be set as an upper limit value of a range in which the coast regeneration torque is reduced but the wheel speed difference or the wheel slip ratio, which is derived based on the speed of the vehicle and the wheel speed of the driving wheel, is not decreased. The correction value may be previously determined in a form of a cubic equation with the variation of the coast regeneration torque as a variable.

In accordance with the method for applying a coast regeneration torque of a vehicle, when the wheel slip occurs while the vehicle is coasting and the coast regeneration torque is applied, stability of the vehicle may be achieved by reducing the coast regeneration torque, and, when the wheel slip ratio (or the wheel speed difference) is not decreased due to a hardware cause of the vehicle even though the coast regeneration torque is reduced, the wheel slip ratio (or the wheel speed difference) may be corrected to determine a state of the vehicle as being stabilized without further reducing the coast regeneration torque.

Therefore, in accordance with the method of applying a coast regeneration torque of a vehicle, it may be possible to resolve the problem of deterioration in energy recovery factor due to an excessive reduction in coast regeneration torque and deterioration of fuel efficiency resulting from the deterioration in energy recovery factor, and it may also be possible to improve driving quality of a vehicle by preventing occurrence of vehicle slip according to reduction in regenerative braking due to a coast regeneration torque.

BRIEF DESCRIPTION OF THE DRAWINGS

The above and other objects, features and other advantages of the present invention will be more clearly understood from the following detailed description when taken in conjunction with the accompanying drawings, in which.

DETAILED DESCRIPTION

Figure 1:
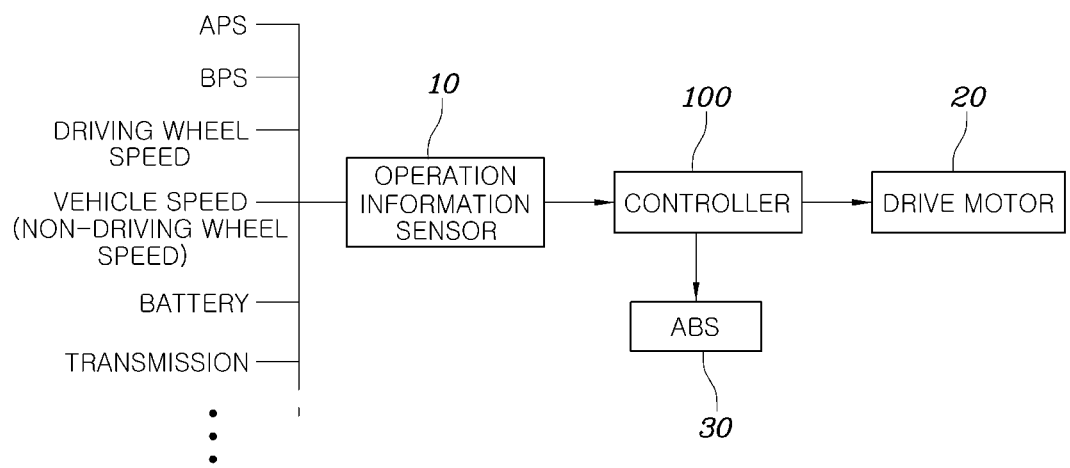
FIG. 1 is a block diagram of a system to which a method for applying a coast regeneration torque of a vehicle according to an exemplary embodiment of the present invention is applied.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referral to herein, a hybrid vehicle is a vehicle that has two or more sources of power, for example both gasoline-powered and electric-powered vehicles.

Although exemplary embodiment is described as using a plurality of units to perform the exemplary process, it is understood that the exemplary processes may also be performed by one or plurality of modules. Additionally, it is understood that the term controller/control unit refers to a hardware device that includes a memory and a processor. The memory is configured to store the modules and the processor is specifically configured to execute said modules to perform one or more processes which are described further below.

Furthermore, control logic of the present invention may be embodied as non-transitory computer readable media on a computer readable medium containing executable program instructions executed by a processor, controller/control unit or the like. Examples of the computer readable mediums include, but are not limited to, ROM, RAM, compact disc (CD)-ROMs, magnetic tapes, floppy disks, flash drives, smart cards and optical data storage devices. The computer readable recording medium can also be distributed in network coupled computer systems so that the computer readable media is stored and executed in a distributed fashion, e.g., by a telematics server or a Controller Area Network (CAN).

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/of" includes any and all combinations of one or more of the associated listed items.

Unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about."

Hereinafter, a method for applying a coast regeneration torque of a vehicle according to various exemplary embodiments of the present invention will be described in detail with reference to the accompanying drawings.

FIG. 1 is a block diagram of a system to which a method for applying a coast regeneration torque of a vehicle according to an exemplary embodiment of the present invention is applied. Referring to FIG. 1, the system to which the method for applying a coast regeneration torque of a vehicle according to the exemplary embodiment of the present invention may include an operation information sensor 10 configured to sense a vehicle operating state, a drive motor 20 configured to generate a driving force and operate as a generator to generate electric energy while a vehicle is coasting, an anti-lock brake system (ABS) 30 configured to adjust a braking force applied to a driving wheel, and a controller 100 configured to determine a coasting regeneration torque, which is regeneratively braked through the drive motor 20, based on operation information sensed by the operation information sensor 10.

Particularly, the operation information sensor 10 may be configured to sense an opening degree of an acceleration position sensor (APS), an opening degree of a brake position sensor (BPS), a speed of the driving wheel, a speed of a non-driving wheel, an external temperature, a battery temperature, a vehicle speed, and the operation information of the vehicle including gear steps (e.g., which gear the vehicle is operating in). The operation information sensed by the operation information sensor 10 may be provided to the controller 100. The operation information sensor 10 may include a wheel speed sensor configured to sense the speed of each of the driving wheel and the non-driving wheel, a temperature sensor configured to sense the external temperature, a battery temperature sensor configured to sense the battery temperature, and a vehicle speed sensor or a wheel speed sensor configured to sense the vehicle speed.

Further, the drive motor 20 may be configured to generate a driving force required for the vehicle to travel from electric energy supplied from a battery (not shown). Alternatively, the drive motor 20 may be configured to operate as a generator to generate electric energy while the vehicle is coasting, and the generated electric energy may be stored in the battery. The controller 100 may be implemented in a form of a processor configured to operate by a predetermined program and a memory configured to store a program, and the predetermined program may be provided to execute each of operations constituting a method of applying a coast regeneration torque of a vehicle according to various exemplary embodiments of the present invention.

The coast regeneration torque is a torque applied opposite a driving direction of the vehicle in a coasting state in which an opening degree of each of an acceleration pedal and a brake pedal is "0," and the coast regeneration torque refers to a torque for which the drive motor 20 operates as a generator to recover inertial energy as power. Generally, the coast regeneration torque is set according to the vehicle speed and the gear steps.

Furthermore, the controller 100 may be configured to vary the coast regeneration torque which is regeneratively braked based on a correction temperature determined from the external temperature sensed by the operation information sensor 10 and the battery temperature, a vehicle slip state determined from the difference in speed between the driving wheel and the non-driving wheel, and a friction coefficient of a road based on the vehicle slip state. In particular, when the ABS 30 does not operate and the difference in speed between the driving wheel and the non-driving wheel (i.e., a wheel slip ratio) is substantial (for example, 3 to 10 km/h), the controller 100 may be configured to reduce the coast regeneration torque. When the difference in speed between the driving wheel and the non-driving wheel increases to be greater than a predetermined speed (for example, 10 km/h), the controller 100 may be configured to operate the ABS 30 to adjust a braking hydraulic pressure delivered to a hydraulic brake. When the difference in speed between the driving wheel and the non-driving wheel becomes greater than the predetermined speed and thus the ABS 30 operates, since slip of the driving wheel may increase due to the coast regeneration torque, the controller 100 may be configured to set the coast regeneration torque to "0" when the ABS 30 operates.

Thus, when the ABS 30 does not operate while the vehicle is coasting, the controller 100 may be configured to set the coast regeneration torque based on wheel slip and operate the drive motor 20 as a generator to implement the set coast regeneration torque. When wheel slip, that is, a difference in speed between the driving wheel and the non-driving wheel occurs, the controller 100 may be configured to reduce a coast regeneration torque to reduce the wheel slip or the difference in speed between the driving wheel and the non-driving wheel.

However, when the wheel slip occurs due to a hardware cause of a vehicle in which tires having different sizes are respectively installed at the driving wheel and the non-driving wheel, or a load of the vehicle is excessively applied to a front wheel such that a speed of the front wheel becomes less than a speed of a rear wheel according to a characteristic of a vehicle suspension when regenerative braking is performed, the wheel slip is still present despite the reduction of the coast regeneration torque and thus, the coast regeneration torque may be excessively reduced. Accordingly, in various exemplary embodiments of the present invention, the controller 100 may be configured to compensate for the wheel slip occurring due to such a hardware cause of the vehicle, that is, the reduction of the coast regeneration torque due to the difference in speed between the driving wheel and the non-driving wheel.

Figure 2:
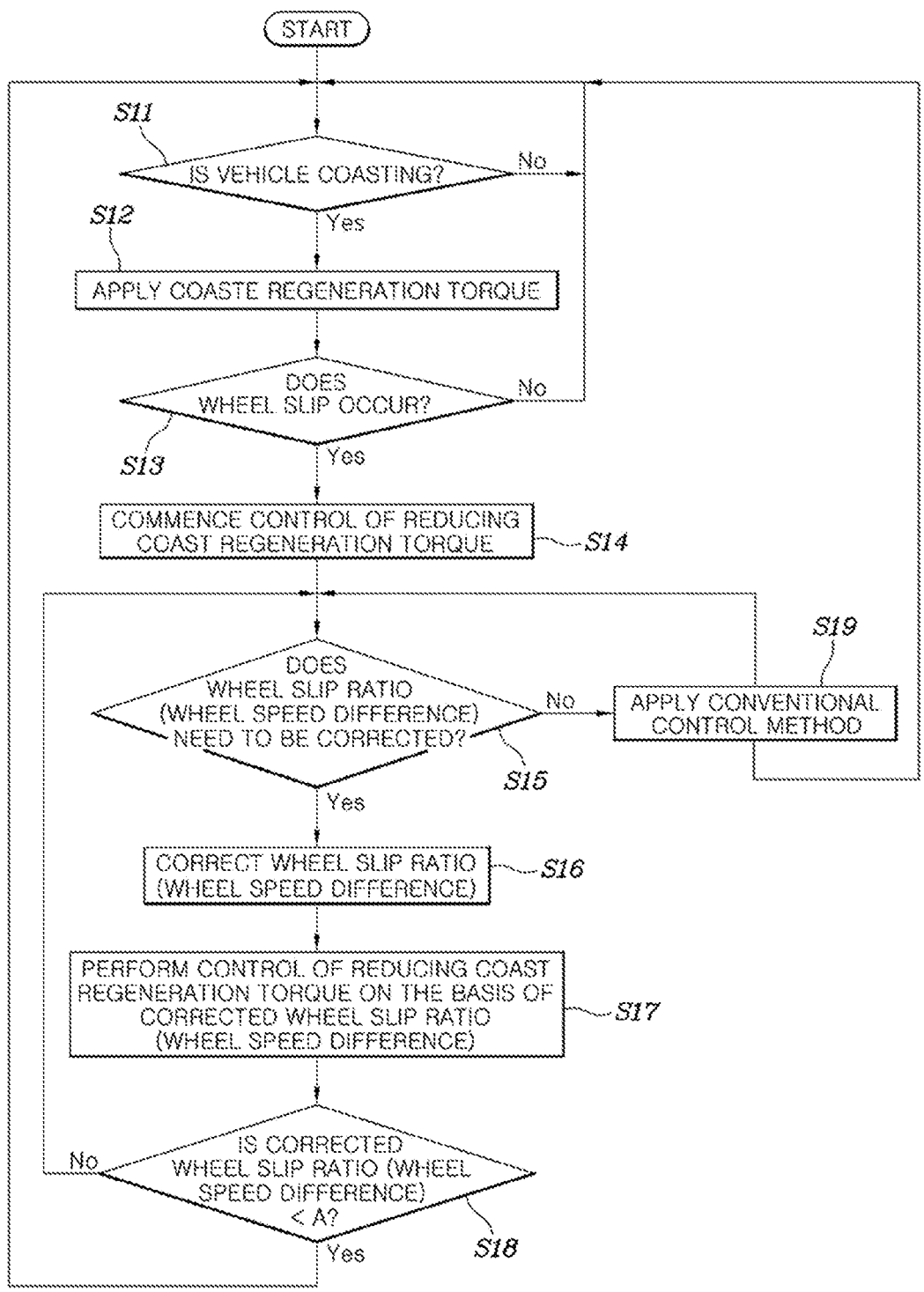
FIG. 2 is a flowchart illustrating a method for applying a coast regeneration torque of a vehicle according to an exemplary embodiment of the present invention.

FIG. 2 is a flowchart illustrating a method for applying a coast regeneration torque of a vehicle according to an exemplary embodiment of the present invention. The method of applying a coast regeneration torque of a vehicle according to the exemplary embodiment of the present invention shown in FIG. 2 may be performed by a program provided at the controller 100, and the operation and action of the system shown in FIG. 1 will be easily understood through a description of FIG. 2.

As shown in FIG. 2, the method of applying a coast regeneration torque of a vehicle according to the exemplary embodiment of the present invention may be commenced after the controller 100 determines whether the vehicle is coasting (S11), generates a coast regeneration torque at the drive motor 20 when the vehicle is coasting (S12), and determines whether wheel slip occurs (S13).

In determining whether the wheel slip occurs (S13), the controller 100 may be configured to determine whether the wheel slip occurred by detecting a difference between a vehicle speed and a speed of the driving wheel of the vehicle. Further, in the operation S13, the controller 100 may be configured to derive a magnitude of the difference between the vehicle speed and the speed of the driving wheel of the vehicle, or a wheel slip ratio which is a ratio of the difference between the vehicle speed and the speed of the driving wheel of the vehicle to the vehicle speed. Alternatively, the controller 100 may be configured to derive a magnitude of a difference in speed between the driving wheel and the non-driving wheel, and a wheel slip ratio by replacing the vehicle speed with a speed of the non-driving wheel.

For example, the controller 100 may be configured to receive a speed of each of the driving wheel and the non-driving wheel from a speed sensor installed at each of the driving wheel and the non-driving wheel or installed within the vehicle, which corresponds to the operation information sensor 10, and may be configured to derive the difference in speed and the wheel slip ratio using the following equations.

$$\Delta v_w = v_v - v_{dw} \text{ or } \Delta v_w = v_{ndw} - v_{dw} \qquad \text{Equation 1}$$

$$r_{ws} = \frac{v_v - v_{dw}}{v_v} \text{ or } r_{ws} = \frac{v_{ndw} - v_{dw}}{v_{ndw}} \qquad \text{Equation 2}$$

In the Equations 1 and 2, $\Delta v_w$ is the wheel speed difference, $v_v$ is the vehicle speed, $v_{dw}$ is a driving wheel speed of the vehicle, $v_{ndw}$ is a non-driving wheel speed of the vehicle, and $r_{ws}$ is the wheel slip ratio.

Additionally, in determining whether the wheel slip occurs, when the speed difference or the wheel slip ratio, which is derived from Equation 1 or Equation 2, is greater than a predetermined reference value (for example, 3 km/h), the controller 100 may be configured to determine wheel slip as occurring, and subsequently, commence control of reducing a coast regeneration torque (S14). In operation S14, the controller 100 may be configured to begin reducing a coast regeneration torque and then reduce the coast regeneration torque to a predetermined magnitude that corresponds to a magnitude of the detected wheel slip ratio (or the detected wheel speed difference, for example, 600 Nm for 3 km/h, 400 Nm for 5 km/h, or 200 Nm for 7 km/h) based on the magnitude thereof in a first control period.

In the above description, the exemplary values are not to limit the invention but merely to aid understanding of the invention.

Further, the controller 100 may be configured to determine whether the wheel slip ratio or the wheel speed difference requires correction, wherein the wheel slip ratio, which is calculated after the coast regeneration torque is reduced according to the occurrence of the wheel slip (S15). The determining of whether the wheel slip ratio or the wheel speed difference (S15) requires corrections may be performed to determine that the cause of the wheel slip ratio or the wheel speed difference is from a hardware effect or failure of the vehicle rather than a condition of a road on which the vehicle is traveling.

Moreover, in operation S15, the controller 100 may be configured to determine whether the wheel slip ratio or the wheel speed difference requires correction based on a magnitude of the coast regeneration torque ($T_{cr}$) being applied, a current wheel slip ratio ($r_{ws}$) or a current wheel speed difference ($\Delta v_w$), a variation in coast regeneration torque ($\Delta T_{cr}$), and a variation in wheel slip ratio or wheel speed difference ($\Delta r_{ws}$ or $\Delta\{\Delta v_w\}$). For example, when "$T_{cr}<\alpha$ (Condition 1)," "$\beta<r_{ws}$ or $\Delta v_w<\gamma$ (Condition 2)," "$\Delta T_{cr}<\delta$ (Condition 3)," and "$\Delta r_{ws}$ or $\Delta\{\Delta v_w\}<\varepsilon$ (Condition 4)" are satisfied, the controller 100 may be configured to determine a correction requirement of the wheel slip ratio or the wheel speed difference.

In particular, $\alpha$, $\beta$, $\gamma$, $\delta$, and $\varepsilon$ may be reference values which are determined in advance through an experimental technique. For example, $\alpha$ of Condition 1 may be calculated as a predicted value that the coast regeneration torque becomes minimal to prevent generation of wheel slip on a low friction road surface, and $\beta$ and $\gamma$ of Condition 2 may be set as upper and lower limit values in a range of predicted offset values that the wheel slip is stabilized but the wheel slip ratio or the wheel speed difference will be generated. Further, $\delta$ and $\varepsilon$ of Conditions 3 and 4 may be set as boundary values in a range which will be determined as a hardware offset of the vehicle since the coast regeneration torque is reduced but the wheel slip ratio or the wheel speed difference is not reduced.

When the controller 100 determines that the wheel slip ratio (or the wheel speed difference) does not require correction in operation S15, a conventional control method of increasing or decreasing the coast regeneration torque based on the wheel slip ratio (or the wheel speed difference) may be applied (S19). The conventional control method performed in operation S19 is a control method for increasing or decreasing the coast regeneration torque based on the magnitude or the variation of the wheel slip ratio (or the wheel speed difference) using a characteristic in which the wheel slip ratio (or the wheel speed difference) increases when the coast regeneration torque is increased whereas the wheel slip ratio (or the wheel speed difference) decreases when the coast regeneration torque is decreased. As described above, the wheel slip ratio (or the wheel speed difference) calculated and derived from Equation 1 or Equation 2 may be applied to the conventional control method, and the wheel slip ratio (or the wheel speed difference) may be derived even when slip does not actually occur due to the hardware effect of the vehicle. Therefore, the present invention performs correcting for eliminating an amount of slip which is not actually present while the vehicle is traveling, but which is reflected to the wheel slip ratio (or the wheel speed difference) derived through the above-described calculation.

Meanwhile, when the wheel slip ratio (or the wheel speed difference) is determined to be corrected in the operation S15, the controller 100 may be configured to correct the wheel slip ratio (or the wheel speed difference) (S16). A correction value applied in the operation S16 satisfies the following requirements.

First, for a vehicle in which hardware wheel slip or a wheel speed difference does not occur, the correction value may be implemented as a monotone increasing value in consideration that the wheel slip ratio or the wheel speed difference is decreased when the coast regeneration torque is reduced whereas the wheel slip ratio or the wheel speed difference is increased when the coast regeneration torque is increased. When the coast regeneration torque is reduced while the wheel slip ratio or the wheel speed difference is not decreased (i.e., hardware wheel slip occurs), the correction value needs to be determined to perform correction control of reducing the wheel slip ratio or the wheel speed difference.

Further, when the coast regeneration torque is increased due to overcorrection and thus wheel slip occurs, the correction value should be set to perform correction control by increasing the wheel slip ratio or the wheel speed difference to stabilize the coast regeneration torque with a normal value. The correction value may be determined at an initial stage to set a gradual amount of reduction in wheel slip or wheel speed difference to prevent overcorrection when the correction control of reducing the wheel slip ratio or the wheel speed difference is performed.

Figure 3:
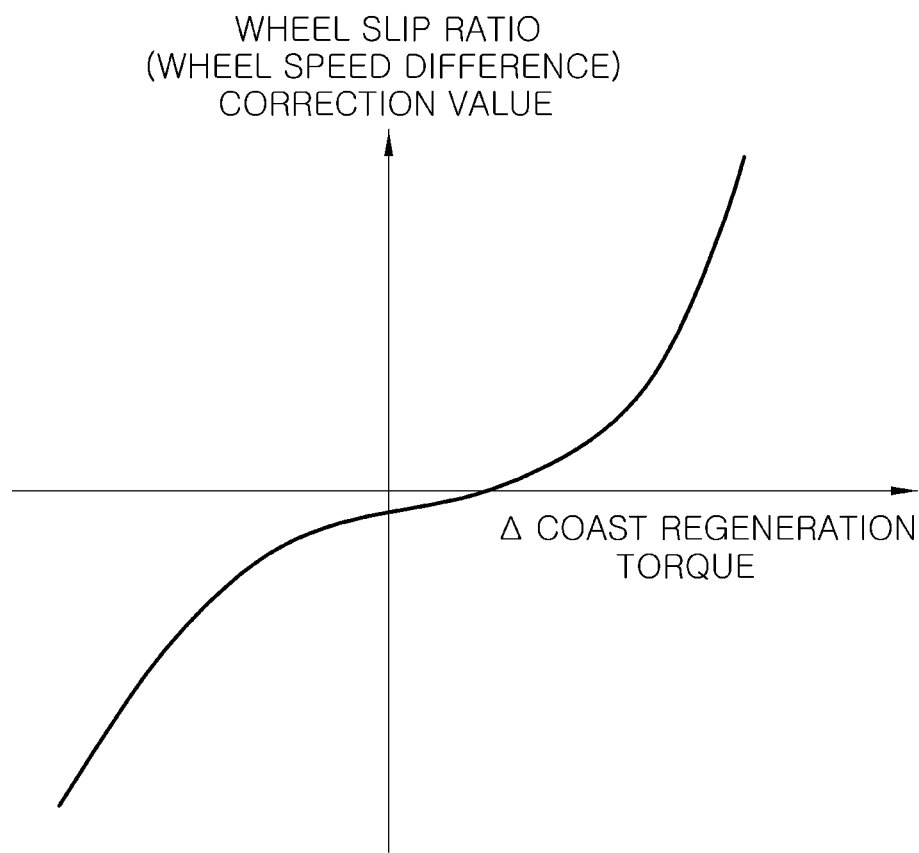
FIG. 3 is a graph illustrating an example of a correction value used in a method for applying a coast regeneration torque of a vehicle according to an exemplary embodiment of the present invention.

Accordingly, as shown in FIG. 3, the correction value may be expressed by a curve of a cubic equation with a variation of the coast regeneration torque as a variable. FIG. 3 is a graph illustrating an example of a correction value used in a method for applying a coast regeneration torque of a vehicle according to an exemplary embodiment of the present invention. As shown in FIG. 3, the correction value may be determined in a form of a cubic function with a torque variation as a variable in the following Equation 3.

$$C_w = a\{\Delta T_{cr}\}^3 + b\{\Delta T_{cr}\}^2 + c\{\Delta T_{cr}\} + d \quad \text{Equation 3}$$

In the Equation 3, $C_w$ is the correction value of wheel slip ratio (or wheel speed difference), $\Delta T_{cr}$ is the variation in coast regeneration torque, and a, b, c and d are constants.

Subsequently, in operation S17, the correction value derived in operation S16 may be applied (or added) to the wheel slip ratio or the wheel speed difference, which is calculated by Equation 1 or Equation 2, to obtain a corrected wheel slip ratio or a corrected wheel speed difference, and then the drive motor 20 connected to the driving wheel of the vehicle may be operated to output a coast regeneration torque that corresponds to the corrected wheel slip ratio or the corrected wheel speed difference on the basis thereof.

Further, when the corrected wheel slip ratio or the corrected wheel speed difference is less than a predetermined reference value A, the controller 100 may be configured to determine that the coast regeneration torque is unable be generated by the vehicle. Additionally, when the corrected wheel slip ratio or the corrected wheel speed difference is greater than or equal to the predetermined reference value A, the controller 100 may be configured to determine a condition in which the coast regeneration torque may still be generated, thereby repeatedly performing the above-described correction control method.

As described above, when the wheel slip occurs while the vehicle is coasting and the coast regeneration torque is applied, the controller 100 may achieve stability of the vehicle by reducing the coast regeneration torque. When the wheel slip ratio (or the wheel speed difference) is not decreased due to a hardware cause of the vehicle even though the coast regeneration torque is reduced, the controller 100 may be configured to correct the wheel slip ratio (or the wheel speed difference) to determine a state of the vehicle as being stabilized without further reducing the coast regeneration torque. Consequently, it may be possible to resolve a problem in which an energy recovery factor is deteriorated due to an excessive reduction in coast regeneration torque reduction and thus, fuel efficiency is deteriorated. Additionally, driving ability of the vehicle may be improved by preventing occurrence of vehicle slip resulting from reduction in regenerative braking due to the coast regeneration torque.

Although an exemplary embodiment of the present invention has been described for illustrative purposes, those skilled in the art will appreciate that various modifications, additions and substitutions are possible, without departing from the scope and spirit of the invention as disclosed in the accompanying claims.

What is claimed is:

1. A method for applying a coast regeneration torque, comprising:
    applying, by a controller, a coast regeneration torque to a drive motor configured to provide power to a driving wheel of a vehicle while the vehicle is coasting;
    detecting, by the controller, occurrence of wheel slip of the vehicle while the coast regeneration torque is applied to the drive motor;
    deriving, by the controller, when the wheel slip occurs, a wheel speed difference or a wheel slip ratio based on a speed of the vehicle and a wheel speed of the driving wheel;
    determining, by the controller, whether to correct the derived wheel speed difference or the derived wheel slip ratio based on a magnitude of the coast regeneration torque, and a magnitude and a variation of the derived wheel speed difference or the derived wheel slip ratio; and
    applying, by the controller, when the derived wheel speed difference or the derived wheel slip ratio is determined to be corrected, a correction value determined based on the variation of the coast regeneration torque to the derived wheel speed difference or the derived wheel slip ratio, and resetting the coast regeneration torque based on the wheel speed difference or the wheel slip ratio to which the correction value is applied.

2. The method of claim 1, wherein the wheel speed difference is determined by a difference between the speed of the vehicle and the wheel speed of the driving wheel or a difference between a wheel speed of the non-driving wheel of the vehicle and the wheel speed of the driving wheel thereof.

3. The method of claim 1, wherein the wheel slip ratio is determined by dividing the difference between the speed of the vehicle and the wheel speed of the driving wheel by the speed of the vehicle, or by dividing the difference between the wheel speed of the non-driving wheel of the vehicle and the wheel speed of the driving wheel thereof by the wheel speed of the non-driving wheel.

4. The method of claim 1, further comprising:
    determining, by the controller, that the derived wheel speed difference or the derived wheel slip ratio is required to be corrected when the magnitude of the coast regeneration torque is less than a first predetermined reference value, and the wheel speed difference or the wheel slip ratio, which is derived based on the speed of the vehicle and the wheel speed of the driving wheel, is in a range of greater than a second predetermined reference value to less than a third predetermined reference value.

5. The method of claim 4, wherein the first predetermined reference value is set as a predicted magnitude of the coast regeneration torque that wheel slip does not occur, and the second and third predetermined reference values are set as upper and lower limit values of a range in which slip does not occur at a wheel of the vehicle and a specific value for the wheel speed difference or the wheel slip ratio is expected to be derived through a calculation for deriving the wheel speed difference or the wheel slip ratio.

6. The method of claim 1, further comprising:
    determining, by the controller, that the derived wheel speed difference or the derived wheel slip ratio is required to be corrected when the variation of the coast regeneration torque is less than a first predetermined reference value, and the wheel speed difference or the wheel slip ratio, which is derived based on the speed of the vehicle and the wheel speed of the driving wheel, is less than a second predetermined reference value.

7. The method of claim 6, wherein each of the first and second predetermined reference values is set as an upper limit value of a range in which the coast regeneration torque is reduced while the wheel speed difference or the wheel slip ratio, which is derived based on the speed of the vehicle and the wheel speed of the driving wheel, is not decreased.

8. The method of claim 1, wherein the correction value is previously determined in a form of a cubic equation with the variation of the coast regeneration torque as a variable.

9. A system for applying a coast regeneration torque, comprising:
an operation information sensor configured to sense a vehicle operating state;
a drive motor configured to generate a driving force and operate as a generator to generate electric energy while a vehicle is coasting;
an anti-lock brake system (ABS) configured to adjust a braking force applied to a driving wheel; and
a controller configured to determine a coasting regeneration torque, which is regeneratively braked through the drive motor, based on operation information sensed by the operation information sensor and apply the coast regeneration torque to the drive motor while the vehicle is coasting,
wherein the controller is configured to:
detect occurrence of wheel slip of the vehicle while the coast regeneration torque is applied to the drive motor;
derive when the wheel slip occurs, a wheel speed difference or a wheel slip ratio based on a speed of the vehicle and a wheel speed of the driving wheel;
determine whether to correct the derived wheel speed difference or the derived wheel slip ratio based on a magnitude of the coast regeneration torque, and a magnitude and a variation of the derived wheel speed difference or the derived wheel slip ratio; and
apply when the derived wheel speed difference or the derived wheel slip ratio is determined to be corrected, a correction value determined based on the variation of the coast regeneration torque to the derived wheel speed difference or the derived wheel slip ratio, and reset the coast regeneration torque based on the wheel speed difference or the wheel slip ratio to which the correction value is applied.

10. The system of claim 9, wherein the wheel speed difference is determined by a difference between the speed of the vehicle and the wheel speed of the driving wheel or a difference between a wheel speed of the non-driving wheel of the vehicle and the wheel speed of the driving wheel thereof.

11. The system of claim 9, wherein the wheel slip ratio is determined by dividing the difference between the speed of the vehicle and the wheel speed of the driving wheel by the speed of the vehicle, or by dividing the difference between the wheel speed of the non-driving wheel of the vehicle and the wheel speed of the driving wheel thereof by the wheel speed of the non-driving wheel.

12. The system of claim 9, wherein the controller is configured to determine that the derived wheel speed difference or the derived wheel slip ratio is required to be corrected when the magnitude of the coast regeneration torque is less than a first predetermined reference value, and the wheel speed difference or the wheel slip ratio, which is derived based on the speed of the vehicle and the wheel speed of the driving wheel, is in a range of greater than a second predetermined reference value to less than a third predetermined reference value.

* * * * *